United States Patent [19]

Layton et al.

[11] Patent Number: 5,363,342
[45] Date of Patent: Nov. 8, 1994

[54] HIGH PERFORMANCE EXTENDED FIBER OPTIC HYDROPHONE

[75] Inventors: Michael R. Layton, Newbury Park; A. Douglas Meyer, Canoga Park, both of Calif.; Bruce A. Danver, Alexandria, Va.

[73] Assignee: Litton Systems, Inc., Beverly Hills, Calif.

[21] Appl. No.: 187,166

[22] Filed: Apr. 28, 1988

[51] Int. Cl.$^5$ .............................................. H04R 23/00
[52] U.S. Cl. .................................... 367/149; 367/141; 367/169; 356/345; 356/351
[58] Field of Search ....................... 350/96.29-96.34; 356/28.5, 345, 351; 181/110, 112; 367/20, 140, 141, 154, 169, 170, 171, 172, 149

[56] References Cited

U.S. PATENT DOCUMENTS

| | | | |
|---|---|---|---|
| 4,160,229 | 7/1979 | McGough | 367/154 |
| 4,162,397 | 7/1979 | Bucaro et al. | 250/199 |
| 4,313,185 | 1/1982 | Chovan | 367/149 |
| 4,363,533 | 12/1982 | Stowe et al. | 367/141 |
| 4,405,198 | 9/1983 | Taylor | 367/169 |
| 4,525,818 | 6/1985 | Cielo et al. | 367/149 |
| 4,568,408 | 2/1986 | Schmadel et al. | 156/626 |
| 4,570,248 | 2/1986 | Assard | 367/149 |

OTHER PUBLICATIONS

"How To Build & Use Low-Cost Hydrophones" by Frank Watlington, Tab Books, Blue Ridge Summit, Pa. 17214, First Edition, First Printing-Jan. 1979.

"Fiber optic hydrophone: improved strain configuration and environmental noise protection" by P. G. Cielo, Applied Optics, vol. 18, No. 17, Sep. 1, 1979.

"Low-Noise Acoustic Sensor Fabrication Detail".

"Theoretical Analysis of a Push-Pull Fiber-Optic Hydrophone" by Graham F. McDearmon, IEEE 1987 Journal of Lightwave Technology, vol. LT-5, No. 5, May 1987.

"Pressure-Balanced High-Pressure Hydrophone" by Edward T. O'Neill, Journal of the Acoustical Society of America, vol. 34, No. 10, Oct. 1972, p. 1661.

"Optical Fiber Sensor Technology" by Thomas G. Giallorenzi, Joseph A. Bucaro, Anthony Dandridge, G. H. Sigel, Jr., James H. Cole, Scott C. Rashleigh, and Richard G. Priest, IEEE Journal of Quantum Electronics, vol. QE-18, No. 4, Apr. 1982.

*Primary Examiner*—J. Woodrow Eldred

[57] ABSTRACT

An acceleration insensitive interferometric hydrophone sensor having increased sensitivity comprises a rigid cylindrical support mandrel that is coaxial with and between thin walled sense and reference mandrels. Flanges on the reference and support mandrels form air filled cavities above and below optical reference and sense fiber windings, respectively, that are symmetrically wound on associated mandrels. The walls of the sense and reference mandrels are thin so that they both respond to the same incident acoustic wave signal although 180° out-of-phase. A central collar on the support mandrel provides an acceleration insensitive location for making attachment to the hydrophone. In another embodiment, the reference mandrel is much thicker than the sense mandrel and cavities supporting the sense fiber are caused to operate as acoustic impedance mismatches for rendering the reference fiber winding substantially insensitive to and acoustically decoupling it from an incident acoustic pressure wave signal. In yet another embodiment which does not employ a reference mandrel, the reference fiber is wound around the support mandrel in cavities above the latter that are caused to operate as acoustic mismatches. The junctions of the mandrels are preferably sealed for isolating the wound length of reference fiber and cavities from fluid in which the hydrophone sensor is located.

47 Claims, 9 Drawing Sheets

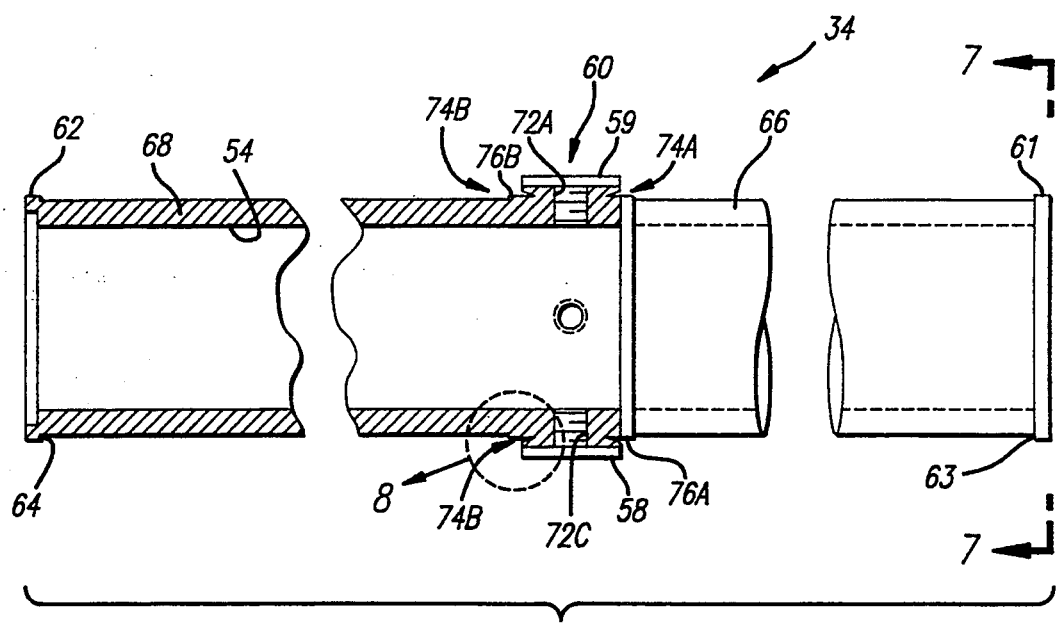
FIG. 6
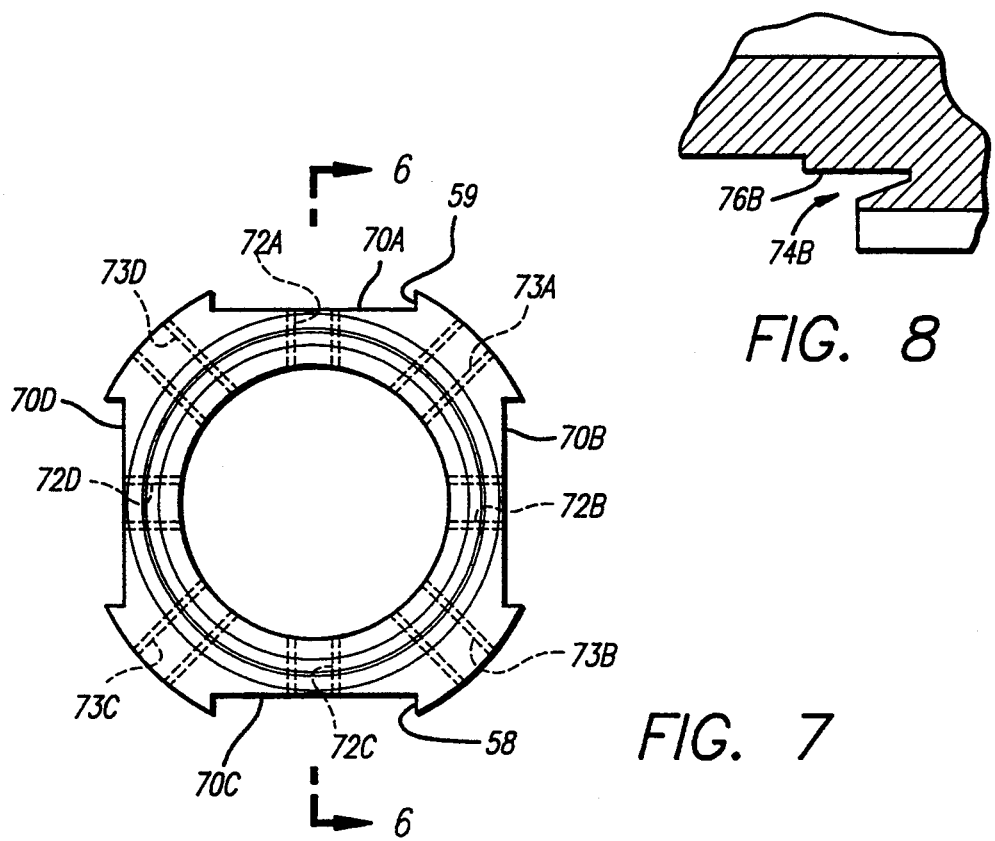
FIG. 8
FIG. 7

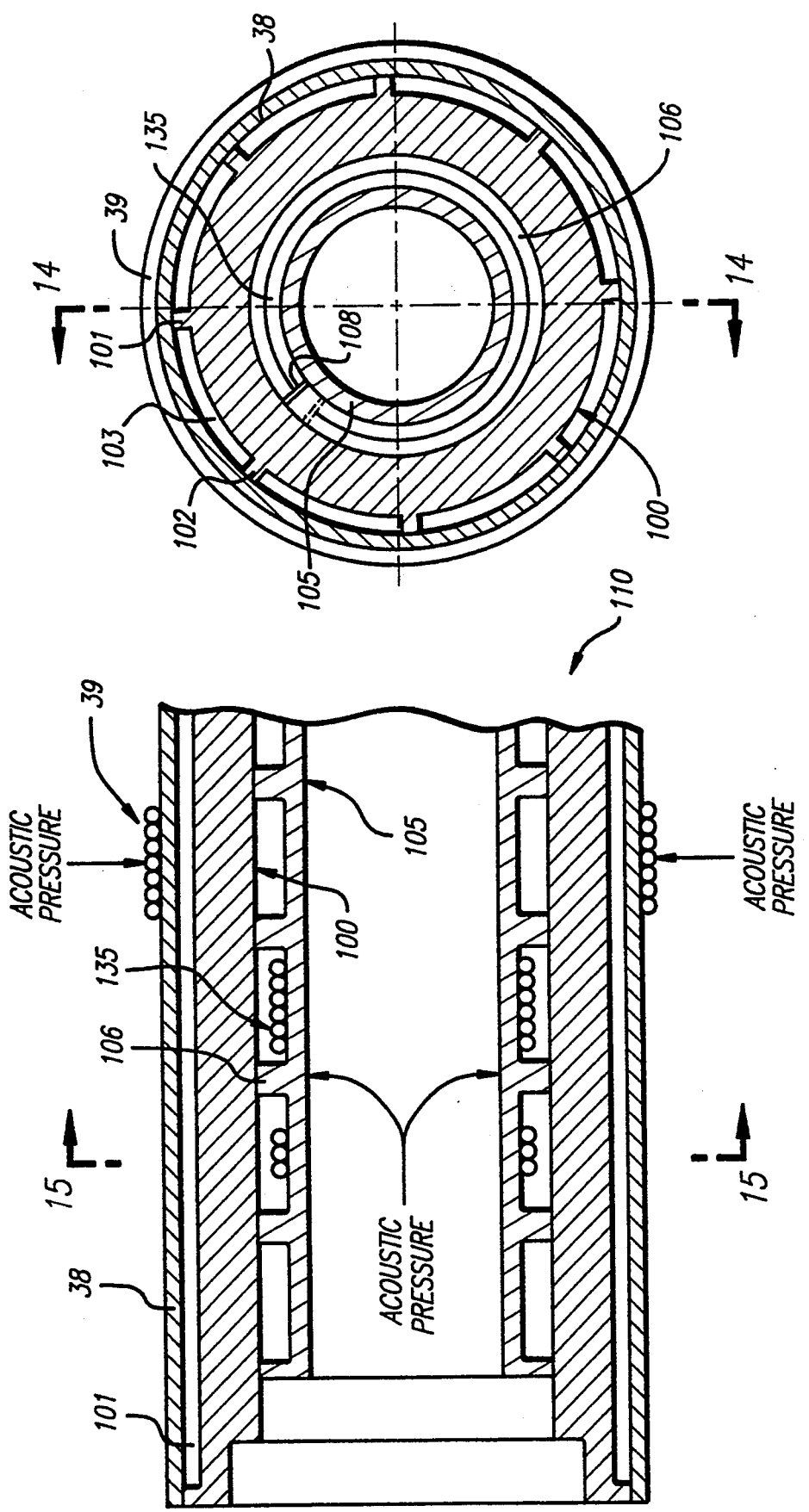

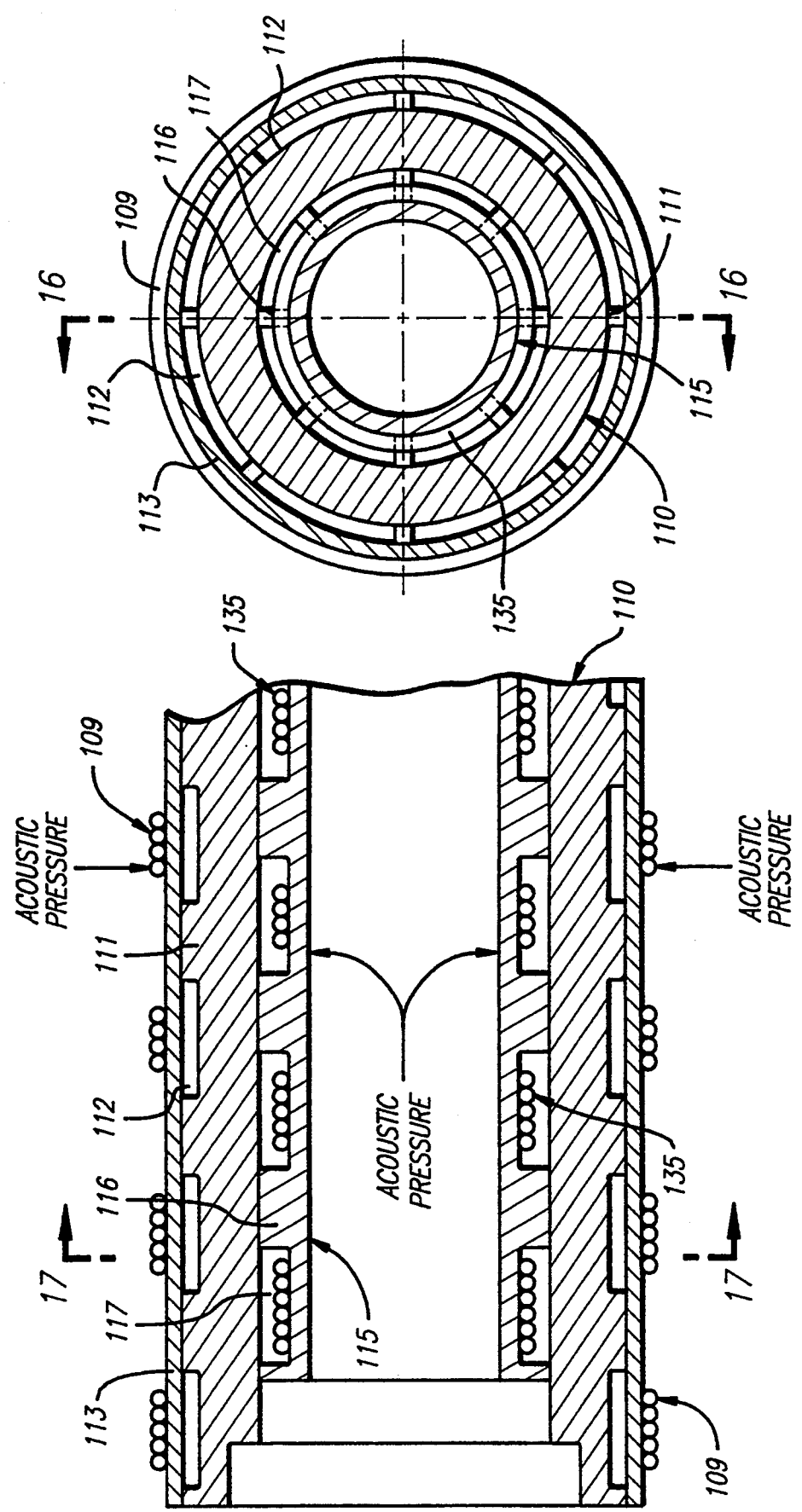

HIGH PERFORMANCE EXTENDED FIBER OPTIC HYDROPHONE

BACKGROUND OF INVENTION

This invention relates to fiber optic acoustic sensors and more particularly to a rigid-mandrel based acceleration insensitive extended fiber optic interferometric hydrophone that is adaptable for inclusion in a serially connected array thereof that can be wrapped around a drum of convenient size.

A hydrophone is essentially an acoustic pressure sensor that is designed for underwater use, e.g., for detecting acoustic wave signals in the ocean. Hydrophone sensors and systems are generally described in the book "How To Build and Use Low-Cost Hydrophones" by Frank Watlington, Tab Books, Blue Ridge Summit, Pa. 17214, Copyright 1979. Fiber optic hydrophones are described in U.S. Pat. No. 4,162,397, Fiber Optic Acoustic Sensor by J. A. Bucaro, et al; 4,525,818, Stable Fiber-Optic Hydrophone by P. G. Cielo, et al; and 4,570,248, Interferometric Hydrophone Reference Leg Low Frequency Compensation by G. L. Assard; and the article Optical Fiber Sensor Technology by T. G. Giallovenzi, et al, IEEE Journal of Quantum Electronics, Vol. QE-18, No. 4, April 1982, pp 626–665.

A hydrophone system generally comprises a plurality of hydrophone sensors that are towed behind a ship. Although descriptions of fiber optic hydrophone sensors are beginning to appear in the literature, the conventional method for the detection of sound in water employs piezoelectric sensors attached to electrical equipment that is also located underwater. This means that electrical power must be supplied to the underwater equipment. This is undesirable since seals in the underwater sensor may leak and cause equipment malfunction and it adds to the weight, bulk, complexity, and cost of a system using such sensors. Also, piezoelectric sensors have limited sensitivity, are prone to pick up extraneous electromagnetic signals, and can be acceleration sensitive. A double tube transducer employing an acceleration cancellation technique is illustrated at page 41 of the Watlington book, Supra.

In a fiber optic hydrophone system, an optical source and photodetector are located on a towing vessel and connected through one or a plurality of optical fibers to a trailing network of fiber hydrophones. Each hydrophone sensor for use in the towed array generally comprises a Mach-Zehnder interferometer, for example, that is formed by two lengths of fiber (arms) that are joined together at opposite ends thereof by couplers that are connected to either input or output bus fibers. One length of fiber (the sense arm) is made sensitive to an incident acoustic pressure wave, while the other length of fiber (the reference arm) is intentionally made substantially insensitive to the incident acoustic pressure by isolating it from the latter. If the reference arm is not well isolated from the acoustic signal and responds to it with the same phase as the sense arm, then the resulting hydrophone can exhibit poor sensitivity. This results from the fact that an optical interferometer senses the difference in optical path between the arms. Techniques that have been previously employed for enhancing the sensitivity of a fiber hydrophone include applying a plastic jacketing material such as nylon over a long length of sense fiber that is wound on the circumference of a rigid-extended (i.e., elongated) mandrel, winding the sense fiber around a thin walled cylindrical shell that is subsequently filled with a pliable epoxy material, backing the sense fiber with an air filled cavity, and fabricating cylindrical sense and reference mandrels out of a compliant plastic material such as nylon or teflon.

One fiber optic hydrophone for use in a towed array comprised sense and reference mandrels that were elongated cylinders having raised circular shoulders or flanges at the centers thereof and that were made out of nylon and ceramic, respectively. The outer dieter of the circular flange on the reference mandrels was dimensioned to make a sliding fit in the interior of the sense mandrel. Separate lengths of single mode fiber that had a prescribed optical pathlength difference (OPD) between them were wound on the circumferences of these mandrels and connected to input and output couplers. The reference mandrel was then inserted into and attached to the sense mandrel at the central shoulder points by screws to provide an acceleration insensitive pulling point. After the optical couplers were located inside the reference mandrel, the interior of the reference mandrel and the space between it and the sense mandrel was filled with a resilient epoxy material. This hydrophone sensor was temperature sensitive, failed under pressure cycling, and had poor isolation of the reference arm from the incident acoustic signal and a resultant low sensitivity. This poor sensitivity is believed to be caused by the signal in the reference arm canceling the signal in the sense arm. The hydrophone failures are believed to have been caused by making the mandrels out of different materials that have different properties and which react differently to thermal and pressure changes. Additionally, an epoxy material is not sufficient to dampen the incident acoustic wave and isolate it from the reference winding.

An object of this invention is the provision of an improved acoustic sensor.

SUMMARY OF INVENTION

In accordance with this invention, an interferometric fiber optic hydrophone sensor comprises a first fiber wound around a hollow cylindrical sense mandrel that is compliant, a hollow cylindrical support mandrel located in the sense mandrel and having a wall that is noncompliant, first support means on the circumference of the support mandrel and contacting the interior of the sense mandrel for defining at least one first cavity backing a wound length of first fiber; a second fiber; second support means for supporting a wound length of second fiber on or inside the support mandrel, and means for connecting spaced apart points on the fibers so as to form an interferometer. The mandrels are preferably circular and symmetrical about a transverse axis perpendicular to their longitudinal axes at the centers thereof. In one embodiment, the second support means comprises the circumference of the support mandrel, the first cavities operating as acoustic impedance mismatches for acoustically decoupling the second fiber winding from acoustic energy that is incident on the first fiber winding. The junctions of the mandrels may be sealed for isolating the wound second fiber and first cavities from fluid in which the sensor is located. In an alternate embodiment, the second support means comprises a hollow cylindrical reference mandrel in the support mandrel, with third support means on its circumference contacting the bore of the support mandrel for defining at least one second cavity between the support and reference mandrels and in which the second fiber is symmetrically wound on the reference mandrel. In another embodiment, the wall thickness of the reference mandrel is much greater than that of the sense mandrel for rendering the reference winding substantially insensitive to incident acoustic energy. In a further embodiment, the will thickness' of the reference and sense mandrels are substantially the same so they are both compliant. In this way the two fiber windings respond 180 degrees out-of-phase to the same incident acoustic pressure wave signal for providing increased sensitivity.

BRIEF DESCRIPTION OF DRAWINGS

This invention will be more fully understood from the following detailed descriptions of preferred embodiments thereof, together with the drawings that are not drawn to scale and in which:

FIG. 6 is a side elevation view of the support mandrel 34 with a portion thereof shown in section;

FIG. 7 is an end view of the support mandrel 34 taken along lines 7—7 in FIG. 6;

FIG. 8 is a greatly enlarged view of a portion of the support mandrel 34 in FIG. 6;

FIGS. 12–18 illustrate other alternate embodiments of this invention.

DESCRIPTION OF PREFERRED EMBODIMENTS

Figure 1:
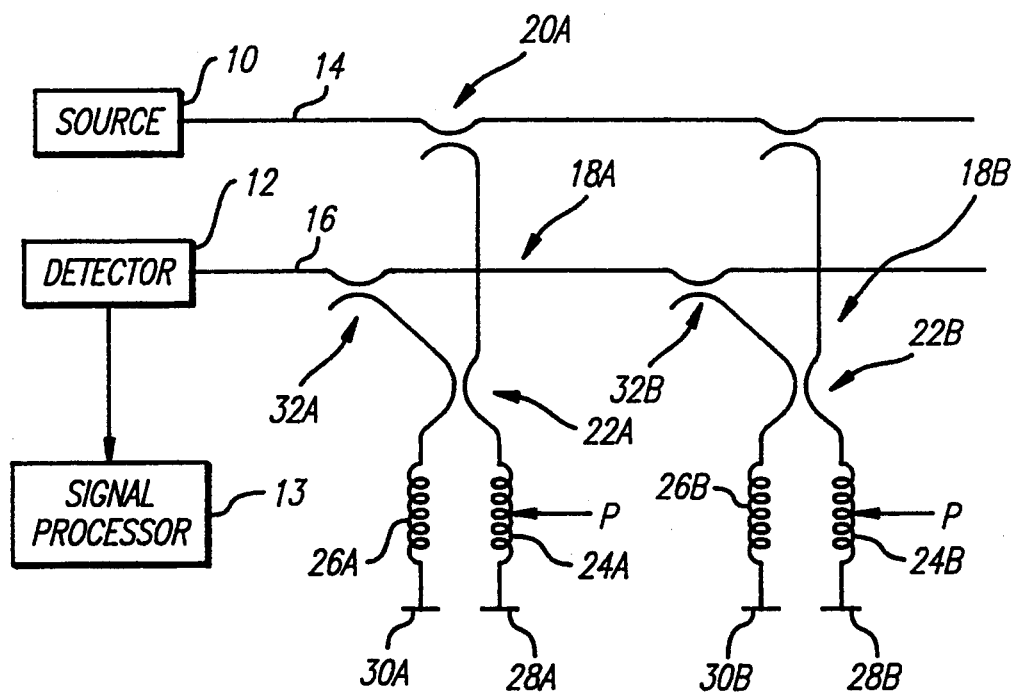
FIGS. 1 and 2 are schematic diagrams of fiber optic interferometric hydrophone systems in which the hydrophone sensors include Michelson and Mach-Zehnder interferometers, respectively.
Figure 2:
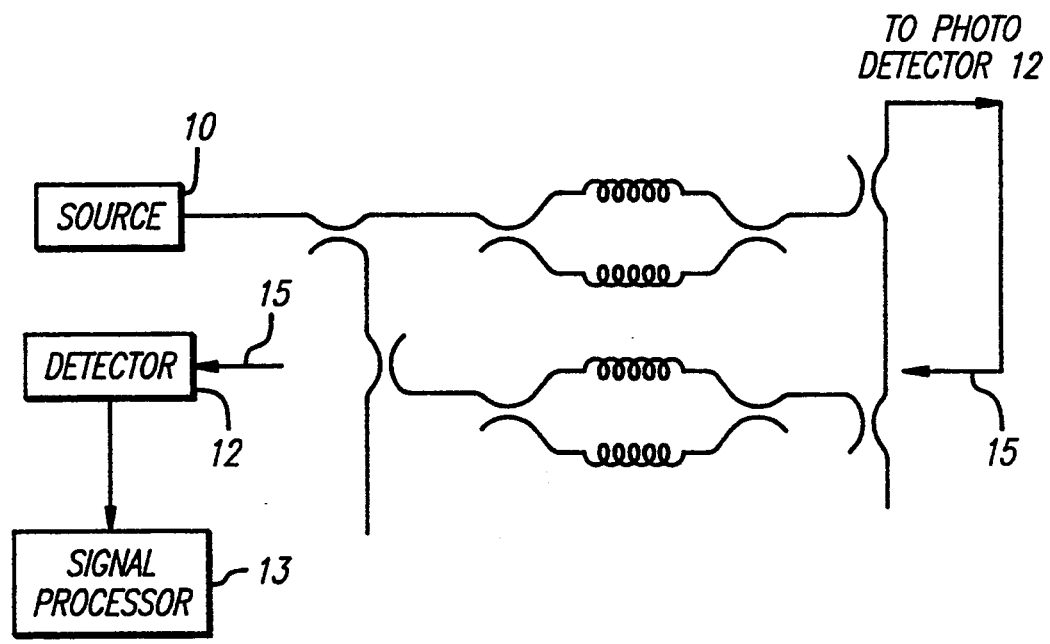

FIGS. 1 and 2 are schematic diagrams of fiber optic interferometric systems which may be helpful in understanding this invention. In the system of FIG. 1, the light source 10, photodetector 12 and signal processor 13 are located on a vessel (not shown) and connected through a pair of optical fibers 14 and 16 to and from a plurality of Michelson interferometer hydrophone sensors 18A, 18B, etc., only one of which will be described in detail since they are all similar in design. Light in optical fiber 14 is coupled through couplers 20A and 22A to the lengths of wound sense and reference fibers 24A and 26A, which are terminated by mirrors 28A and 30A, respectively, of the Michelson interferometer 18A. Light reflected by the mirrors is connected through couplers 22A and 32A to the output fiber 16 and thus to photodetector 12. Alternatively, a single fiber may be employed that has sections thereof set up by partially reflecting mirrors so that light in them undergoes multiple reflections.

The coupler 22A has a splitting ratio of nominally 50/50 (3 dB) for launching light of equal intensity into fibers 24A and 26A. Lengths of these fibers may be wound on mandrels that are mounted coaxially in the hydrophone sensor. These fibers 24A and 26A are normally of the same length, but may intentionally have a prescribed OPD therebetween. Although the reference fiber 26A is intentionally isolated from an incident acoustic pressure wave signal P that is traveling through the water, the sense fiber 24A is located so as to be fully responsive to the incident acoustic signal P which then produces dimensional changes in the length of the fiber 24A and thus in the time delay of light traversing its length. This acoustically-generated change in the path length of the sense fiber 24A produces a phase shift relative to that of light in the reference fiber 26A Light in fibers 24A and 26A are combined in coupler 22A and coupled through coupler 32A to fiber 16. The photodetector 12 converts light energy in fiber 16 into electrical signals which may be processed in a signal processor 13 in the conventional manner. FIG. 2 illustrates a hydrophone system employing Mach-Zehnder type interferometric sensors.

Figures 3, 4:
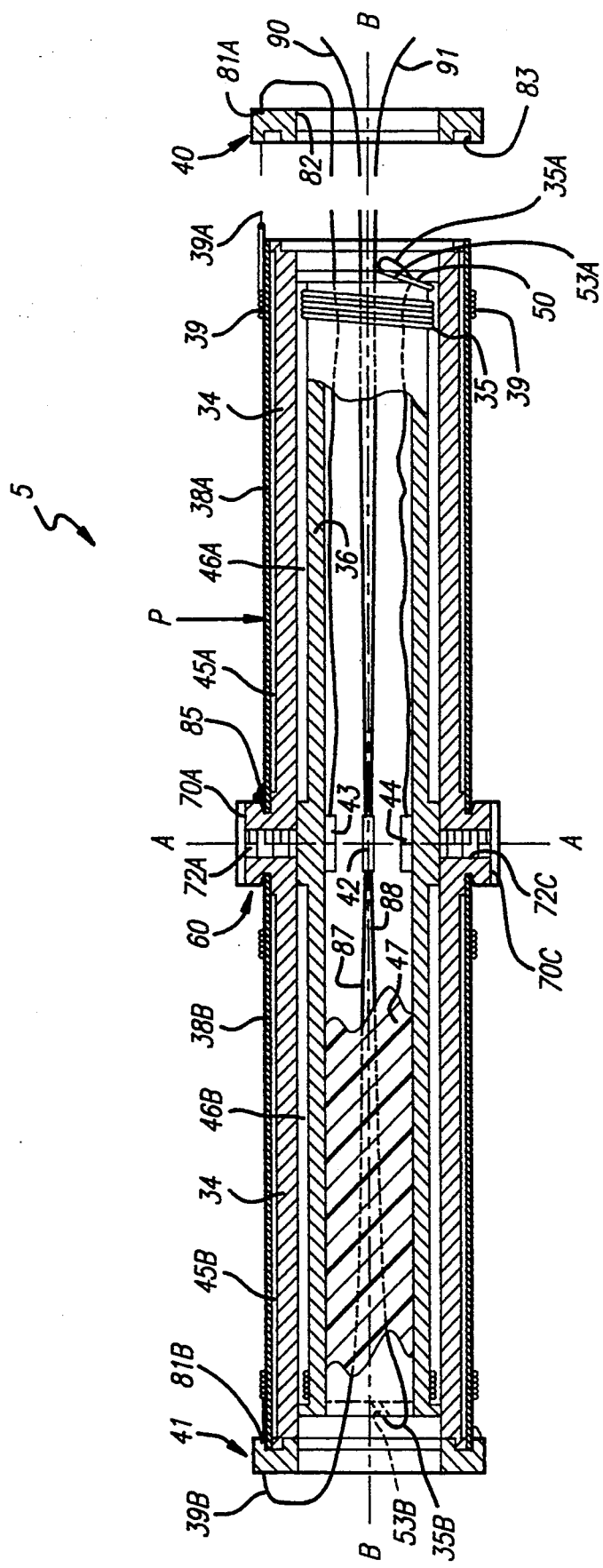
FIG. 3 is a longitudinal section view of an assembled hydrophone sensor 5 embodying this invention, with only portions of the reference and sense optical fibers 35 and 39 being shown on the sensor body structure for the sake of clarity of illustration.
FIG. 4 is a section view of a sealing ring 40 located at the right end of the sensor body in FIG. 3.

Referring now to FIGS. 3 and 4, a hydrophone sensor 5 embodying this invention is preferably symmetrical about the axes A—A and B—B thereof. Although this hydrophone sensor 5 is configured as a Michelson interferometer, it could just as well be configured as a Mach-Zehnder interferometer due to the general nature of this sensor body.

The hydrophone 5 comprises a cylindrical support mandrel 34, a continuous length of reference fiber 35 that is wound on a cylindrical reference mandrel 36 that is located in the bore of the support mandrel 34, a pair of thin-willed symmetrical sense mandrels 38A and 38B on support mandrel 34 that support a continuous length of sense fiber 39, a pair of sealing rings 40 and 41 for sealing the ends of the sensor body, a fiber coupler 42, a pair of reflective fiber terminations, i.e., mirrors, 43 and 44 that are symmetrically located in and bonded to the wall of the bore of the reference mandrel 36, and a sealer material 47 such as epoxy in the bore of the reference mandrel. The support mandrel 34 and reference mandrel 36 are similar in shade (see FIGS. 5 and 6), with the support mandrel being the larger and operating as an internal framework to which other parts are attached. The fibers 35 and 39 are preferably continuously symmetrically wound around the reference and sense mandrels over the full lengths of the mandrels. The symmetry of the hydrophone minimizes its sensitivity to acceleration along the B—B axis in FIG. 3. This is because there is a resultant compression of one-half of the mandrels and elongation of the other half thereof when the hydrophone sensor body is held at the central collar 60 of the support mandrel 34, for example, while an acceleration is applied along the longitudinal axis B—B. The net result to the acceleration is zero change in the lengths of the fibers.

In accordance with one aspect of this invention, there is a first pair of air gaps 45A and 45B backing the sense mandrels 38. These first air gaps 45 operate as highly compliant backings for the thin walled sense mandrels 38. More particularly, these air gaps 45 enhance the response of the sense fiber to an acoustic signal P for increasing the scale factor change in optical path length per unit acoustic pressure and thus the sensitivity of the hydrophone. These air gaps 45 also present an acoustic impedance (product of density and sound velocity) mismatch to acoustic energy incident on the thin sense mandrel for preventing further propagation of this signal.

In accordance with another aspect of this invention, a second pair of larger air gaps 46A and 46B are formed above the reference mandrel. These air gaps 46 house the reference fiber 35 and operate as acoustic impedance mismatches for isolating acoustic pressure wave signals from the reference fiber. More particularly, the cavities 46 operate as impedance barriers which attenuate and reflect an incident acoustic signal that may be transmitted through the first air gaps 45 and the relatively thick support mandrel since the air has an acoustic impedance that is much different than the acoustic impedance of surrounding materials. Also, the reference mandrel 36 is made much thicker than the sense mandrels 38 in FIG. 3 for causing the reference mandrel to isolate the reference fiber 35 from an acoustic pressure wave signal in the bore thereof. The size of the air gap is a function of the intended operating pressure before failure, material type, and wall thickness of the various associated parts of the hydrophone. The bore of the reference mandrel 36 is filled with an epoxy material 47 such as chock-Fast Orange (TM of Philadelphia Resins Corporation) to protect the fibers and couplers. This epoxy is also believed to aid in attenuating an incident acoustic pressure wave signal.

The body of the hydrophone sensor 5 in FIG. 3 comprises support mandrel 34, reference mandrel 36, thin walled sense mandrels 38 and sealing rings 40 and 41. The support mandrel 34 is the framework for other sensor body parts and also provides attachment points when several hydrophones are joined together to form a hydrophone array. All of the sensor body parts are preferably made of the same material, which may be an aluminum alloy such as 7075-T6. Alternatively, the body parts may be made of materials such as delrin, nylon, teflon, other metals, and ceramic materials. It is important that all of the hydrophone body parts be made of the same material so that temperature changes, for example, do not produce a net differential phase shift, which is undesirable, in the windings 35 and 39. The 7075-T6 aluminum alloy is preferred for properties such as strength, weight, elastic modulus, thermal conductivity, bending, cost, and machinability. In particular, its modulus of elasticity allows it to withstand the pressure cycling that a hydrophone sensor experiences in operation. Also, its strength and elastic modulus allow the walls of the sense mandrels 38 to be very thin, which results in a much greater scale factor, as is described more fully hereinafter.

Figure 5:
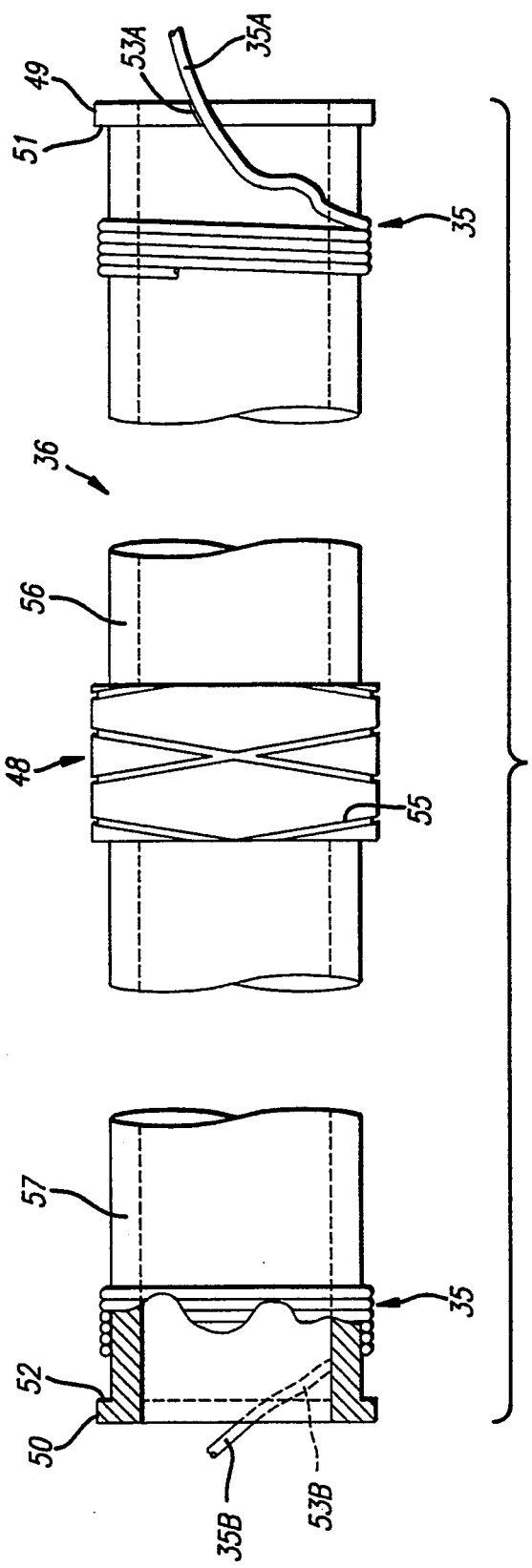
FIG. 5 is a side elevation view of the reference mandrel 36 with a portion thereof shown in section.

Referring now to FIG. 5, the reference mandrel 36 has a central collar 48 and shoulders 49 and 50 on opposite ends thereof that define elongated cylindrical recesses 51 and 52. The reference mandrel portions 56 and 57 that support the reference fiber 35 in these recesses are preferably much thicker than the sense mandrels 38A and 38B for providing acoustic isolation of the reference fiber 35 from acoustic energy signals in the bore of the reference mandrel 36. The shoulders on the ends of the reference mandrel have diagonal slots 53A and 53B therethrough which provide a passageway for the ends 35A and 35B of the reference fiber. The central collar 48 has grooves 55 therein that are deeper than the dieter of the cladded reference fiber 35 for providing a passageway for the latter as it is wound continuously and symmetrically over the length of the reference mandrel 36 on both sides of the collar 48. The diameters of the shoulder ends 49 and 50 and collar 48 are dimensioned to slide smoothly into the bore of the support mandrel 34. This structure provides the air gaps 46 and the resultant acoustic impedance discontinuity for aiding in isolating the reference fiber 35 from incident pressure signals.

The support mandrel 34 (see FIG. 6) has a shape similar to that of the reference mandrel 36. The central collar 60 and shoulders 61 and 62 on opposite ends thereof define shallow cylindrical recesses 63 and 64 that extend over the major portion of the length thereof. These recesses are not designed to carry a length of fiber, however, in the embodiment of this invention in FIG. 3. The elongated cylindrical portions 66 and 68 of the support mandrel 34 are about the same thickness as the cylindrical portions 56 and 57 of the reference mandrel, and much thicker then those of the sense mandrels, for providing structural support for and rigidity to the hydrophone sensor body and isolating acoustic pressure signals from the winding on the reference mandrel. The central collar 60 has four flats 70A–70D and two sets of threaded holes 72A–72D and 73A–73D symmetrically located in the circumference thereof. The flats 70 provide a passageway for a fiber 39 that is wound on the sense mandrels 38. The holes 72 receive set screws for securely attaching the reference mandrel to the support mandrel. The holes 73 receive screws for holding an apertured cylindrical cage (not shown) that goes over and protects the hydrophone sensor. They also provide attachment points when several hydrophones are joined together to form an array thereof. Cylindrical tapered recesses 74A and 74B (see FIGS. 6, 8 and 9) are formed on opposite sides of the collar 60 for receiving adjacent ends of the sense mandrels 38A and 38B, as is described more fully hereinafter and illustrated in FIG. 9. The FIG. 8 is a greatly enlarged view of the tapered recess 74B.

Figure 9:
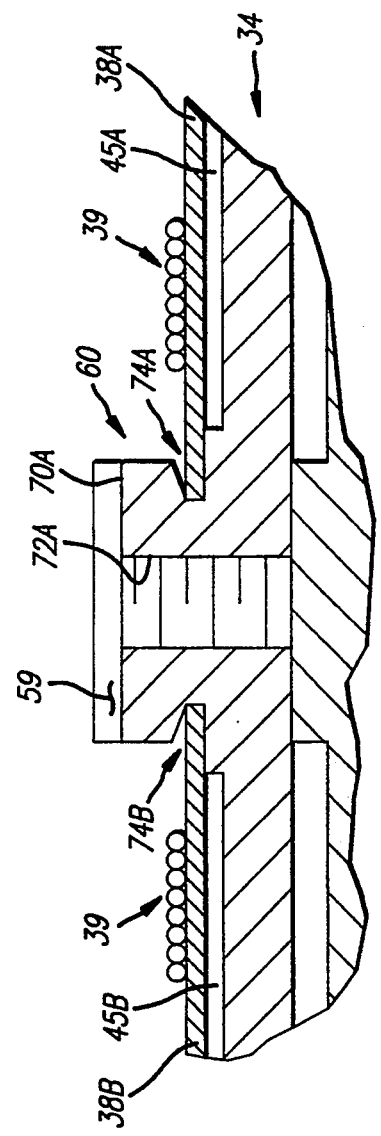
FIG. 9 is a greatly enlarged view of the center portion of FIG. 3.

The sense mandrels 38A and 38B are thin walled hollow aluminum tubes or cylinders that are identical in size and shape and on which the continuous length of sense fiber 39 is wrapped. The bores of the sense mandrels are therefore substantially the same as the diameters of the shoulders 61 and 62 of the support mandrel and the shoulders 76A and 76B on the central collar 60 of the latter so that they make a firm sliding fit over these shoulders, with adjacent ends of the sense mandrels sliding into the tapered slots 74A and 74B as is illustrated in FIG. 9. When the sense mandrels are slid over the support mandrels and supported only at the ends and collar of the former, the air gape 45 are formed which provide the high compliance backing for the sense mandrels. This causes an increase in the scale factor or sensitivity of the hydrophone. The thickness of the air gape 45 is a function of the maximum hydrostatic operating pressure for the hydrophone, the type of material it is made of, and the thickness of the sense mandrels.

The sealing rings 40 and 41 are illustrated in FIGS. 3 and 4. The ring 40, for example, has a central opening 82 therethrough and a cylindrical recess 83 cut in one side thereof. This recess 83 is dimensioned for sliding smoothly over the adjacent ends of the support mandrel 34 and sense mandrel 38A for capturing and fixing the position of the sense mandrel 38A while allowing epoxy to flow into the openings in and between the parts for making a hermetic seal, as is described more fully hereinafter.

The order of assembly of the sensor body parts is as follows. After a heat curable epoxy such as Ablebond 789-6M epoxy from Able Stik Co. is applied to the tapered recesses 74A and 74B on the collar of the support mandrel 34, the sense mandrels 38A and 38B and slid over the support mandrel. The grooves 83 in the sealing rings 40 and 41 are then filled with the same epoxy material and slipped over the ends of the support and sense mandrels for sealing the junctions of these parts. Epoxy fillets 85 are also carefully formed around the openings 74A and 74B, as well as around the junctions of the rings and the sense mandrels, for sealing any openings in these parts. This unit is then baked for curing the epoxy. Diagonal slots 81A and 81B are cut into the cured epoxy and the rings 40–41 for providing paths through which opposite ends of the sense fiber can smoothly exit the sense mandrels.

The diagonal slots 53A, 53B and 55 that are cut in shoulders 49 and 50 and the collar of the reference mandrel 36 provide paths in which the reference fiber is routed onto and off of the reference mandrel and over the collar 48. The reference fiber is located in the slot 53A, for example, tacked to the inside edge of the shoulder 51 with a fast drying glue such as super glue (cyanocacrylate glue) and then dry wrapped under tension (to help achieve uniform contact with the mandrel) and in a symmetrical fashion over sections 56 and 57 of the reference mandrel 36 (see FIG. 5). The reference fiber is also attached to the edges of the collar and the shoulder 50 with super glue for fixing the position of the fiber on the reference mandrel. One lead 88 of the coupler 42 is fused to one end 35B of the reference fiber 35. A second lead 87 of the coupler is fused to one end 39B of the fiber 39 that is to be wrapped on the sense mandrels 38A–38B. The fusion junctions of the fibers are protected with a sleeve or jacket and slipped into the bore of the reference mandrel and glued to the wall thereof. The coupler 42 is also slipped into and tacked to the wall of the bore of the reference mandrel. Any remaining loose fiber leads can be coiled up and temporarily located inside the reference mandrel. A coating may be applied to reference fiber 35 to either enhance or decrease the sensitivity of the system.

The wrapped reference arm subassembly 36 in FIG. 5 is slid inside the bore of the support mandrel 34 and temporarily locked in place with set screws in the threaded holes 72. The sense fiber 35 is then wrapped on the sense mandrels 38A and 38B in the same manner was the reference fiber.

After forming the sense arm, the output leads 90 and 91 of the coupler 42 and the free ends 35A and 39A of the fibers are removed from the bore of the reference mandrel. The set screws are then removed from the holes 72 which are filled with a thermally setting epoxy into which the set screws are replaced and tightened against the reference mandrel. This provide a strong mechanical connection and a hermetic seal between the reference and support mandrels after the epoxy is cured. After the free ends of the fibers 35A and 39A are adjusted to prescribed lengths and connected to mirrors 43 and 44, they are jacketed for protecting these elements. These jacketed mirrors are centered in and bonded to the bore of the reference mandrel. The adjacent lengths of fiber are also tacked to this bore in the reference mandrel.

A Kevlar reinforcement jacket (not shown) is slipped over the output leads 90 and 91 of the coupler 42 which is released from the interior wall of and hung freely in the center of the bore of the reference mandrel while a two-part epoxy resin 47 such as Chock-Fast Orange(™), which is available from Philadelphia Resins Corporation, is caused to fill the bore and made to form molded caps (not shown) over the bores in the rings 40 and 41. After this resin is cured, an exterior coating of polyurethane is applied over the sense fiber 39 and collar 60 and a polyurethane strain relief type of tab (not shown) is molded over the jacketed fibers 90 and 91. This serves to make the sensor Ere robust and does not effect the overall scale factor or phase response of the sensor. A rigid aperture walled stainless steel tube (not shown) is slid over the completed assembly and attached thereto with screws that extend into the holes 73. In a hybrid system application, the output fibers 90 and 91 are connected through couplers 20 and 32 to the buss fibers 14 and 16 in FIG. 1, for example, respectively. In an array application, a plurality of hydrophone sensors are connected together through screws in the holes 73 that hold the apertured stainless steel tube to the hydrophone body and inserted into a kerosene oil filled polyurethane tube, for example, that has substantially the same acoustic impedance as sea water as is well known in the art.

The acoustic sensitivity or scale factor of an optical fiber winding is a measure of the degree to which it responds to a prescribed incident pressure wave signal. More specifically, it is a measure of the phase shift or change in propagation delay impressed on light in the fiber per unit pressure for each acoustic frequency of interest. The intrinsic acoustic sensitivity of the fiber is a function of the optical wavelength of light in the fiber and the coating on the fiber. As was described previously, the acoustic sensitivity is enhanced by helically wrapping the fiber around the circumference of a cylindrical mandrel that is made of an appropriate material and/or providing the fiber with a compliant backing. The intrinsic acoustic sensitivity of a fiber is expressed in units of dB re 1 rad/rad*micropascal, where these units are normalized with respect to optical wavelength and fiber length, and are thus independent of the optical wavelength. The fiber length is expressed in radians of frequency of the light signal in the fiber. These units give the number of radians of phase shift per unit of acoustic pressure per unit of static phase (i.e., length) of fiber. The resultant acoustic scale factor of the finished hydrophone sensor results from the difference between the responses of the sense and reference arms of the interferometer.

The response of each arm of the interferometer can be represented as a phasor in the x-y plane. The length of the phasor indicates the magnitude of the response to an acoustic signal, and the orientation or angle of the phasor indicates the phase of the response relative to the acoustic signal. The over-all hydrophone response is then determined by subtracting the reference arm phasor from the sense arm phasor. This is equivalent to subtracting two complex numbers.

The following example graphically illustrates how import it is to isolate the reference winding of the hydrophone interferometer from the incident acoustic pressure wave signal in fiber optic interferometric hydrophones. It should be remembered, however, that the response of both sense and reference arms will typically vary as a function of the acoustic frequency so that the complex response of each winding should be determined at all acoustic frequencies of interest in order to determine the resultant over-all behavior of the hydrophone sensor.

The present practice is to provide as much isolation as possible between the reference winding and an incident acoustic pressure wave signal. Consider, for example, the hydrophone sensor in which the sense arm response to an incident acoustic signal is 1 (i.e., a unit response) and is in phase (i.e., zero degree phase difference) with the acoustic signal and that the reference arm response is of the same phase but is ten times less (i.e., 0.1). The resultant hydrophone response is then 0.9, or about 1 dB less than the sense arms response alone. If the sensitivity of the reference arm is one-half that of the sense arm, however, then the resultant acoustic scale factor or sensitivity of the hydrophone is reduced to 0.5. This means that the resultant hydrophone scale factor is now 6 dB less than the sensitivity of the sense arm by itself. These examples illustrate the importance of isolating the reference arm from an acoustic pressure wave signal in order to achieve maximum hydrophone scale factor.

If both sense and reference arms have the same magnitude and phase response, then the resultant hydrophone scale factor is zero. If the reference arm in this instance is made to respond 180° out-of-phase with respect to the sense arm (i.e., of the opposite sense), however, then the resultant hydrophone scale factor will be twice that of the sense arm alone for a 6 dB gain in scale factor.

In accordance with this invention, this is accomplished by making the sense and reference arms respond with opposite sign to an incident acoustic pressure wave signal. Stated differently, the sense winding is made to increase in length while at the same time the reference winding decreases in length for the same incident acoustic signal. The net difference in length between these windings is then twice what it would be if the reference arm were completely isolated from the incident acoustic pressure wave signal. This produces a corresponding increase in the scale factor of the hydrophone sensor. This operation is accurate for acoustic wavelengths that are long compared to the size (i.e., length) of the overall hydrophone sensor, which is the case for hydrophone sensors described here. In this instance both mandrels see the same acoustic pressure signal substantially simultaneously.

Figure 10:
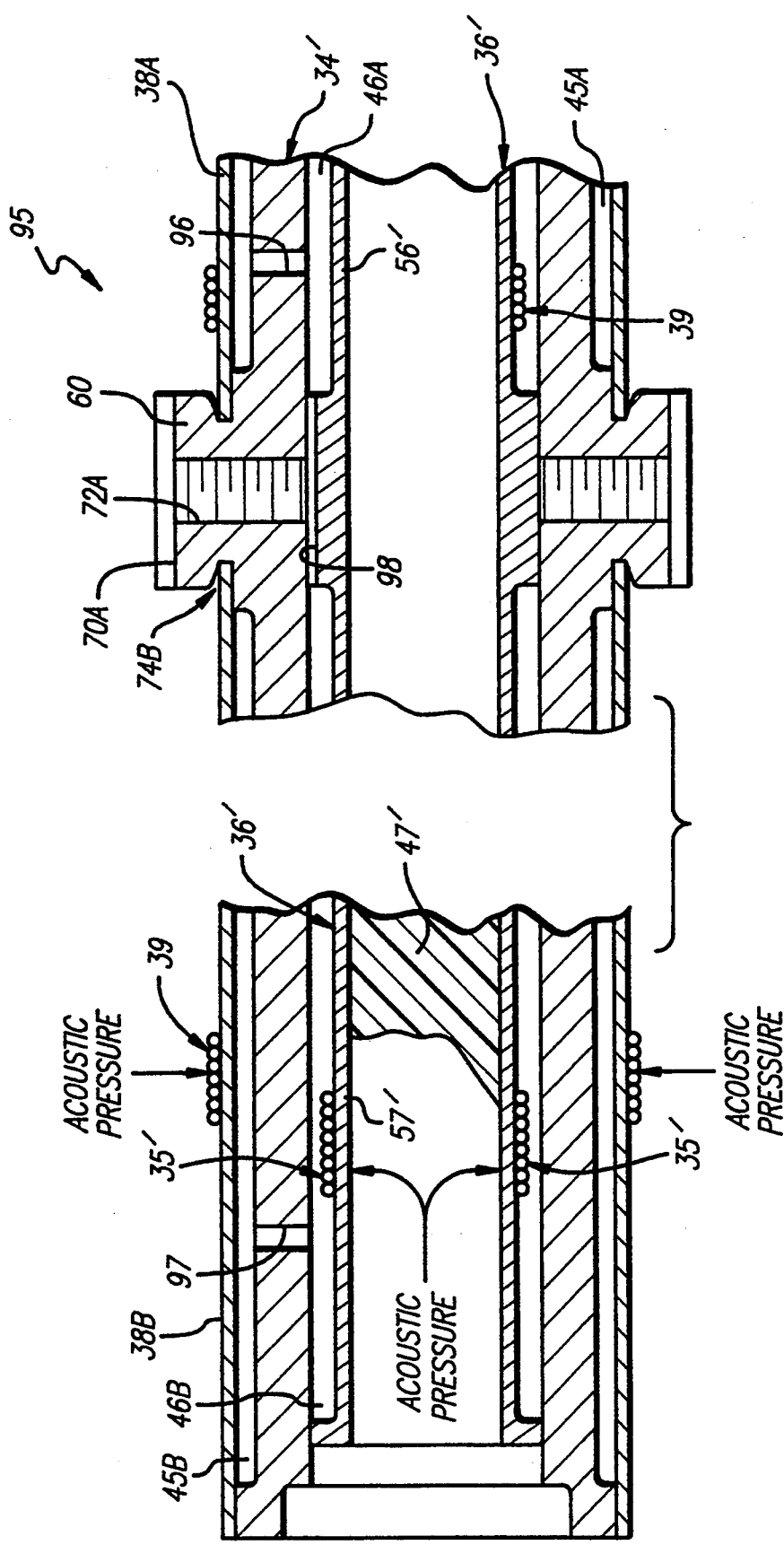
FIG. 10 is an enlarged section view of a portion of a hydrophone sensor 95 for illustrating an alternate form of this invention.

Referring now to FIG. 10, an alternate embodiment of this invention having substantially higher acoustic sensitivity then the hydrophone 5 in FIG. 3 comprises a reference winding 35' that is also made sensitive to an incident acoustic pressure wave signal, but with its phase response being 180° out-of-phase with respect to that of the sense winding 39. The hydrophone sensor 95 in FIG. 10 is substantially the same as that in FIG. 3 except that the reference and sense fibers 35' and 39 are both wound on thin walled air backed tubes so that the reference winding is no longer isolated from an acoustic pressure wave signal. Stated differently, the wall thicknesses of the sections 56' and 57' of the reference mandrel are made substantially the same as the thicknesses of the sense mandrels 38A and 38B so that they have approximately the same acoustic response. The bore of the reference mandrel may be left open/empty, completely filled with a resilient material such as polyurethane 47' which is believed to pass the acoustic signal with substantially zero attenuation, or filled with a thin layer of epoxy or polyurethane material which protects the fibers, couplers, and mirrors in the bore of mandrel 36. Even without any fill material in the bore of mandrel 36, this structure eliminates any cancellation of signals in the sense and reference windings. And since acoustic energy is transmitted through the epoxy 47' with minimal attenuation when the hydrophone sensor is inserted in an oil filled tube in a hydrophone application, then substantially the same acoustic pressure wave signal acts on the sense and reference windings and mandrels, but with opposite sense or sign. This means that an increase in acoustic pressure causes the outer-sense mandrels and fiber to decrease in size (i.e., to bend inwards so that the sense fiber decreases in length). In contrast, this same pressure signal causes the inner-reference mandrel 36' and fiber to expand (i.e., to bend outward so that the reference fiber increases in length). Since the difference in the lengths of the sense and reference fibers may now be up to twice what it would be if the reference fiber were completely isolated from the incident acoustic wave signal, the hydrophone 95 in FIG. 10 can have an increase in scale factor of up to 6 dB. Also, the embodiment in FIG. 10 may comprise a plurality of holes 96–97 and channel 98 in the support and reference mandrel for interconnecting the various cavity sections for equalizing the static pressure in them, preferably to that of the fluid in which it is located.

In a hydrophone 95 in FIG. 10 that was built and successfully operated, the support mandrel 34 had a collar OD of 1.25 inches, a bore of 0.750 inch, a cavity 45 thickness of 0.005 inch, a wall thickness of 0.090 inch, and was 5.8 inches long. The wall thickness of the sense and reference mandrels was 0.025 inch and the air gaps 46 were approximately 0.050 inch thick. This hydrophone 95 provided an increase in scale factor of greater than 20 dB over that for the prior art hydrophone sensor (supra). Stated differently, this hydrophone 95 had a scale factor of greater than $-138$ dB re rad/uPA at 830 nm wavelength using 42 meters of fiber. The frequency response for hydrophone 95 was tested over a range of 5 to 1500 Hz and at a 3°, 12°and 22° C. Pressures of 100, 300, 500, and 700 psi were used at each temperature and frequency. The scale factor (in dB re: rad/uPa) was flat and varied by no more than $\pm 1.5$ dB over this range. The phase response of the hydrophone, which was taken at the same time as the scale factor measurements, was flat and varied less than 5 degrees from 5 to 1000 Hz. At 1000 Hz the phase rolled up to 10 degrees. When the hydrophone was cycled from 300 to 1500 psi (corresponding to a depth of 205 to 1024 meters) at a constant temperature of 22° C., the scale factor changed by only 0.2 dB and the phase by 0.7 degree. These measurements were made at two frequencies, 48 and 250 Hz, at 300 psi.

The current practice in hydrophone array applications is to employ a light source 10 which operates at a 830 nanometer wavelength and hydrophone sensors having an outer diameter of 1.250 inches. Such systems may employ optical fibers which have acceptable bend loss for mandrel diameters of 0.650 inch as are described here. As in many fields, however, the trend is toward longer wavelength sources and smaller diameter hydrophone sensors that can accommodate lower loss fibers. It is proposed that the next generation of hydrophone sensors have a 0.750 inch outer diameter and employ 1300 nanometer wavelength optical fibers which are less lossy and require lower tolerances to splice, connection and coupler losses, but which generally have higher bend loss. Since sensitivity is a function of wavelength, however, the scale factor at this longer wavelength will be 4 dB less for light of 1300 nanometers than of 830 nanometers (20 log 830/1300). Dispersion shifted or high numerical aperture type optical fibers may find application with such longer wavelength sources.

Figure 11:
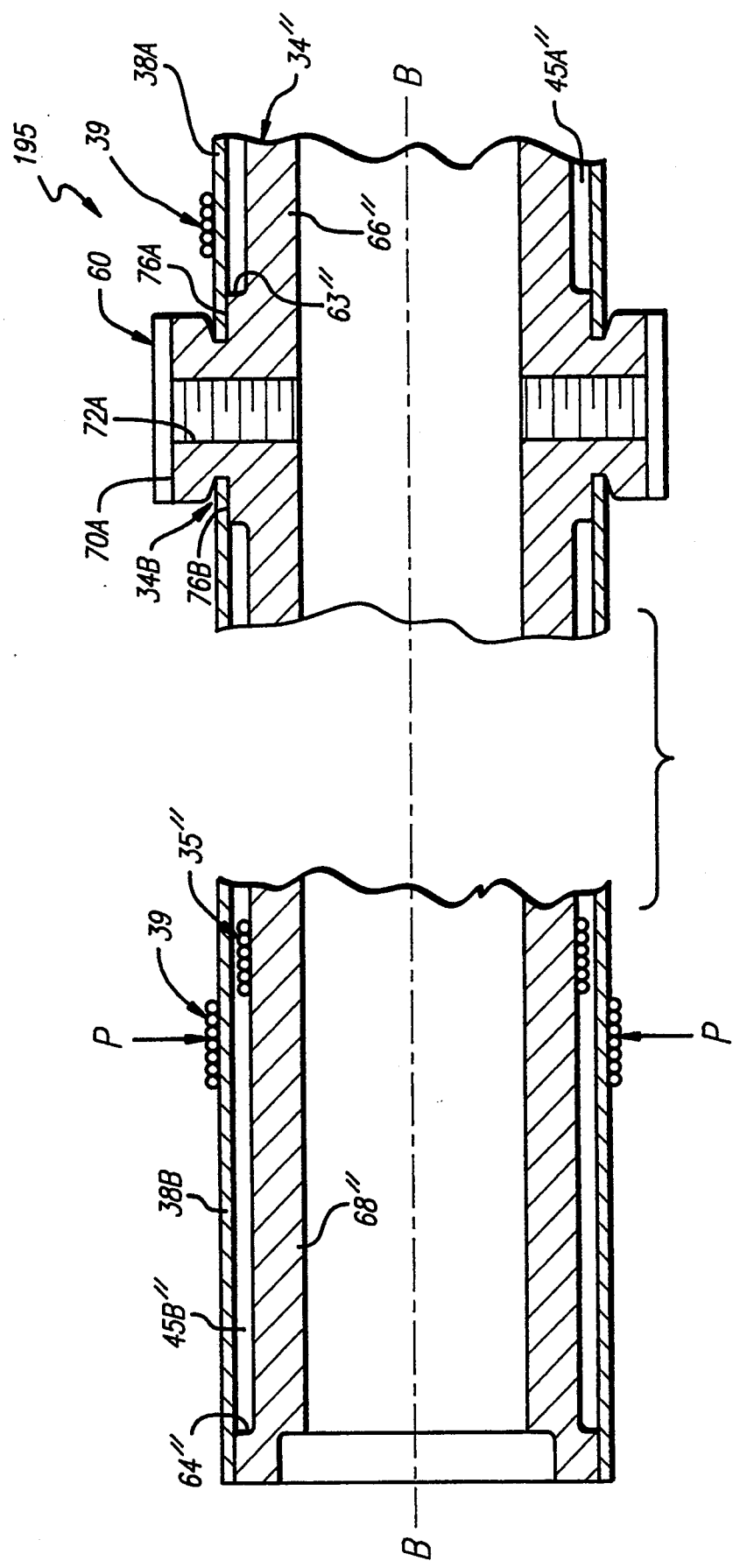
FIG. 11 is an enlarged section view of yet another hydrophone sensor 195 for illustrating a further embodiment of this invention.

Referring now to FIG. 11, the sensor body of an alternate embodiment of this invention that provides a larger radius of curvature for the reference fiber in a reduced diameter hydrophone comprises only a support mandrel 34", a pair of sense mandrels 38A and 38B, and a pair of end caps (not shown). It does not employ a separate reference mandrel. Rather, the depths of the recesses 63" and 64" in the support mandrel are increased to approximately 0.050 inch to accommodate the reference fiber 35. In this structure, grooves (not shown) are cut in the collar 60 over the full lengths of the shoulder 76A and 76B of the support mandrel to the depth of the recesses 63" and 64" for accommodating the reference fiber in the collar region. The sense fiber 39 is wound on the sense mandrels as before. The air gaps 45" here provide the dual function of providing a compliant air gap behind the sense fiber 39 for increasing its sensitivity while at the same time providing the requisite impedance boundary mismatch for isolating the reference winding 35" from an incident acoustic pressure wave signal. The thicknesses of the sections 66" and 68" of this support mandrel 34 my be increased to improve the isolation of the reference winding from an incident acoustic wave signal. The bore of the support mandrel is preferably potted with an attenuating epoxy material.

Figure 18:
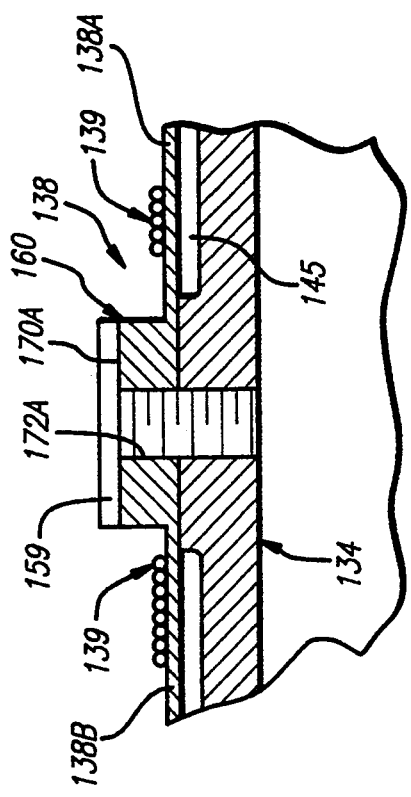

A sensor can also be built so as to allow for the compensation of static (DC) pressure due to change in depth. This in essence causes the sensor to be AC coupled. FIG. 18 shows a modification of sensor 95 of FIG. 10 that includes a second but smaller support mandrel 132. This mandrel 132 provides the necessary support for the reference mandrel 36" as well as creating an air gap 133. A small pilot hole 130 is made in the shoulder of the reference mandrel 36". This hole 130 allows the chamber 46' to become filled with the fluid, thus allowing equalization to the external pressure. Both the sensing mandrel 38 and reference mandrel 36" now respond to the external static pressure (caused by depth) in the same direction. Thus the sensor responds to AC acoustic signals while not being affected by DC pressure.

Figure 12:
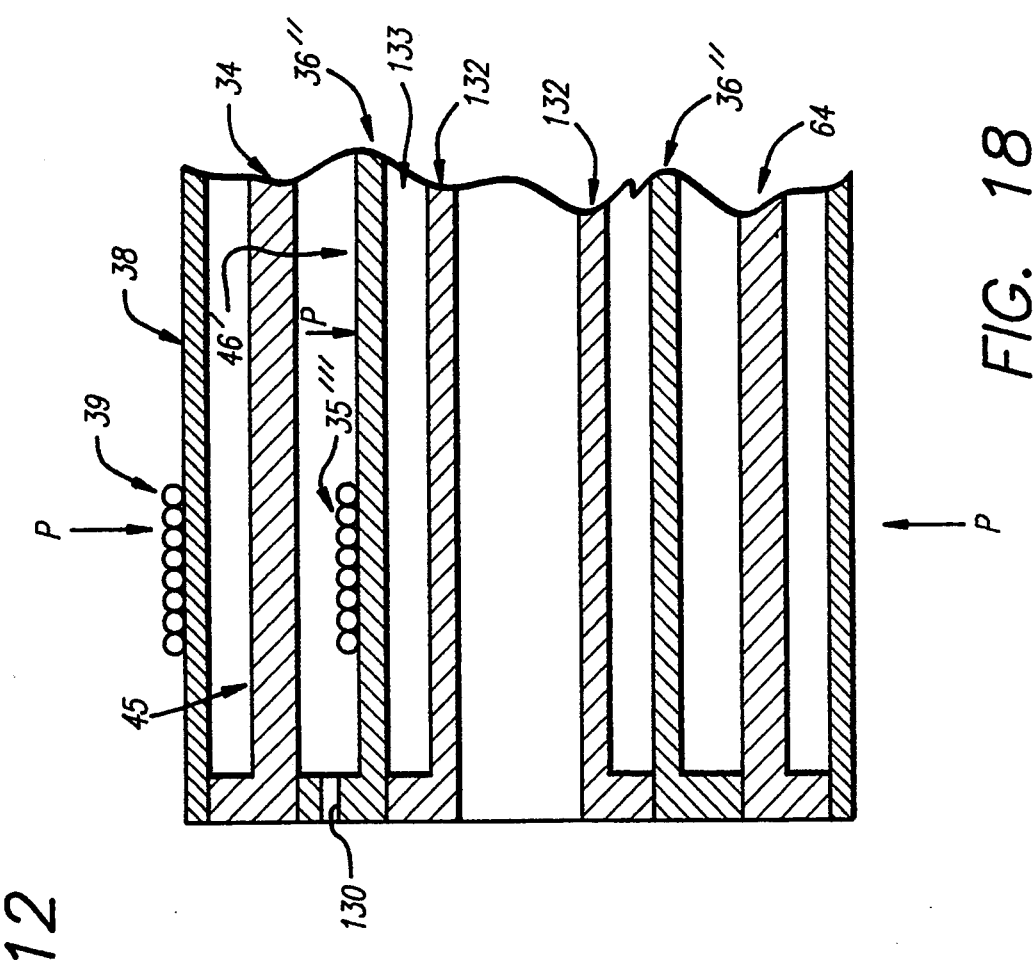
Figure 13:
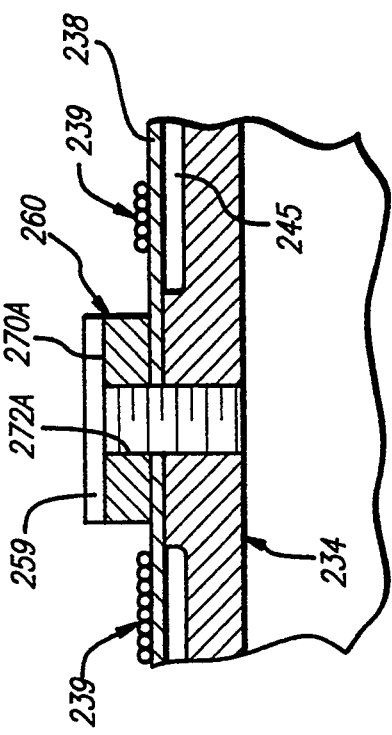

Although this invention is described in relation to preferred embodiments thereof, variations and modifications thereof may be apparent to those skilled in the art. By way of example, a part or all of the bore of the reference mandrel 36 in FIG. 3 Pay be left open in a low noise hydrophone application. Also, the sensors described here may be placed in a media other than water for sensing acoustic signals. In particular, they may also be used for seismic exploration. Additionally, the collar 60 may be deleted from the support mandrel 34 and made as a part 160 of a single sense mandrel 138 as is shown in FIG. 12 with the collar and mandrels secured together with screws (not shown). Or the collar 60 may be deleted from mandrel 34 and the collar made as a separate part 260 as is shown in FIG. 13, with the collar and mandrels secured together with screws (not shown). In this instance the sense mandrels 38A-38B are a single continuous tube 238. Further, a plurality of circumferential shoulders 49 and/or 61 may be periodically spaced apart over the lengths of the sense and support mandrels (see FIGS. 14-15). Also, a thin elongated sense mandrel may be supported over its length by longitudinal ribs located on and periodically spaced apart around the circumference of the support mandrel. These ribs may be continuous or periodically spaced apart along the length of the support mandrel as is illustrated in FIGS. 14-17. In the structure in FIGS. 16-17, the sense winding is preferably wound over areas in which the ribs are not located. Additionally, a thin elongated reference mandrel may be supported by periodically spaced apart rib segments as is illustrated in FIGS. 16-17. In this structure a continuous length of reference fiber is wound between spaced apart ribs which have diagonal slots 108 (see FIG. 15) therein for the passage of the fiber. These structures in FIGS. 14-17 may be particularly useful in shaping beam patterns for the hydrophone, the structure in FIG. 3 having an omnidirectional beam pattern. Also, the gas in the cavities 45 and 46 may be under a prescribed pressure for tuning the cavities to a seawater depth at which the hydrophone is to operate, e.g., by assembling the hydrophone body in a vacuum chamber or with a valve (not shown). Further, attachment may be made internally of the mandrels when the hydrophone is connected in a hydrophone array application. The scope of this invention is therefore to be determined from the appended claims rather than from the aforementioned detailed descriptions of preferred embodiments thereof.

Referring to FIG. 18, the hole 130 permits acoustic signals in the medium that are below a prescribed cutoff frequency to impinge on the fibers 35", yet blocks acoustic signals above this cutoff frequency. The hole 130 acts therefore as an acoustic lowpass filter. The resultant hydrophone response is sensitive therefore only to acoustic signals above this cutoff frequency. The relationship between the dimensions of the hole 130 and the cutoff frequency is described in detail in the article "Pressure-Balanced High Pressure Hydrophone", by Edward T. O'Neill, Jour. Acoust. Soc. Am., vol. 34, No. 10, p. 1661.

What is claimed is:

1. An acoustic pressure sensor comprising:

A first cylindrical mandrel means that is a sense mandrel means, is hollow, and has a wall that is compliant in response to an incident acoustic pressure wave signal;

A first optical fiber wound around the circumference of said first mandrel means;

A second cylindrical mandrel means that is a support mandrel, is hollow, and has a wall that is noncompliant;

First means located on and extending above the circumference of said second mandrel means so as to support the inner wall of said first mandrel means for defining at least one first cavity backing a wound length of said first fiber when said second mandrel means is located in said first mandrel means;

A third cylindrical mandrel means that is hollow;

Second means located on and extending above the circumference of said third mandrel means so as to contact and be supported by the inner wall of said second mandrel means for defining at least one second cavity between said second and third mandrel means;

A second optical fiber wound around the circumference of said third mandrel means in the second cavities; and Third means for connecting points on said first and second fibers so as to form an interferometer.

2. The sensor according to claim 1 wherein said mandrel means are circular in cross section and symmetrical about a transverse axis that is perpendicular to the longitudinal axes of said mandrel means at the centers thereof, and said first and second fibers are wound symmetrically on associated mandrels on opposite sides of said centers thereof.

3. The sensor according to claim 2 wherein said first means comprises a plurality of first flanges that are parallel to each other and are spaced apart on and extend equidistant above the circumference of said second mandrel means for defining a plurality of first cavities between adjacent first flanges and said first and second mandrel means, and said second means comprises a plurality of second flanges that are parallel to each other and are spaced apart on and extend equidistant above the circumference of said third mandrel means for defining a plurality of second cavities between adjacent second flanges and said second and third mandrel means.

4. The sensor according to claim 3 wherein the thickness of the wall of at least the cavity portions of said third mandrel means is sufficiently greater than that of said first mandrel means to render said second fiber winding substantially insensitive to an incident acoustic pressure wave signal in the bore of said third mandrel means.

5. The sensor according to claim 3 wherein said cavities operate as acoustic impedance mismatches for acoustically decoupling said second fiber winding from acoustic pressure that is incident on said first fiber winding in a fluid in which the apparatus is to be located.

6. The sensor according to claim 4 further comprising fourth means for hermetically sealing junctions of said mandrel means for isolating said wound length of second fiber and said cavities from a fluid medium in which the apparatus is to be located.

7. The sensor according to claim 4 wherein said second mandrel means and ones of said first and second means have openings therethrough for interconnecting said cavities for equalizing the pressures therein.

8. The sensor according to claim 4 wherein a gas in said cavities is pressurized to a prescribed pressure.

9. The sensor according to claim 4 wherein said mandrel means and first and second means are all made of the same materials.

10. The sensor according to claim 9 wherein said material is aluminum alloy.

11. The sensor according to claim 3 wherein the thickness of the wall of the cavity portions of said third mandrel means is substantially the same as that of said first mandrel means for also making said third mandrel means compliant whereby said first and second fiber windings respond 180° out-of-phase to the same acoustic pressure wave signal that is incident on said first winding and in the bore of said third mandrel means.

12. The sensor according to claim 11 further comprising fourth means for hermetically sealing junctions to said mandrel means for isolating said second cavities from a fluid in which the apparatus is to be located.

13. The sensor according to claim 11 wherein said second mandrel means and ones of said first and second means have openings therethrough for interconnecting said cavities for equalizing the pressures therein.

14. The sensor according to claim 11 wherein a gas in said cavities is pressurized to a prescribed pressure.

15. The sensor according to claim 11 wherein said mandrel means and first and second means are all made of the same materials.

16. The sensor according to claim 15 wherein said material is aluminum alloy.

17. The sensor according to claim 11 further comprising a cylindrical collar means located centrally of and extending above said first mandrel means and having passageways therein for receiving said first fiber as it passes from one side of said collar means to the other.

18. The sensor according to claim 17 further comprising fourth means for rigidly attaching said collar means and mandrel means together at the centers thereof, and fifth means at said centers thereof which operate as attachment points in an array of sensors for providing sensors that are substantially insensitive to acceleration.

19. The sensor according to claim 11 including at least one pilot hole in one of said mandrel means for opening said cavities to a fluid medium in which the sensor is to be located.

20. The sensor according to claim 4 including at least one pilot hole in one of said mandrel means for opening said cavities to a fluid medium in which the sensor is to be located.

21. An interferometric fiber optic sensor for sensing acoustic wave energy in a fluid medium, comprising:

A first cylindrical mandrel means that is a sense mandrel means, is hollow, and has a wall that is compliant in response to an incident acoustic pressure wave signal;

A first optical fiber wound around the circumference of said first mandrel means;

A second cylindrical mandrel means that is a support mandrel means, is hollow, and has a wall that is noncompliant;

A first means located on and extending above the circumference of said second mandrel means so as to contact the interior of said first mandrel means for defining at least one first cavity backing a wound length of said first fiber when said second mandrel means is located in said first mandrel means;

A third cylindrical mandrel means that is a sense mandrel means and is hollow located in the bore in said second mandrel means;

A second means located on and extending above the circumference of said third mandrel means so as to contact the interior of said second mandrel means for defining at least one second cavity between said second and third mandrel means;

A second optical fiber wound around the circumference of said third mandrel means in said second cavities;

A fourth cylindrical mandrel means that is a support mandrel means and is hollow located in the bore in said third mandrel means;

A third means located on and extending above the circumference of said fourth mandrel means so as to contact the interior of said second mandrel means for defining at least one third cavity between said third and fourth mandrel means;

One of said third mandrel means and said second means having a pilot hole opening therethrough for exposing said second cavities and second fiber winding to the fluid medium; and Fourth means for connecting points on said first and second fibers so as to form an interferometer;

Said mandrel means being coaxial and symmetrical about longitudinal axes thereof.

22. The sensor according to claim 21 wherein said mandrel means are circular in cross section and symmetrical about a transverse axis that is perpendicular to the longitudinal axes of said mandrel means at the centers thereof.

23. The sensor according to claim 21 wherein said mandrel means are circular in cross section and said third mandrel means has a wall defining said third cavities that is noncompliant.

24. The sensor according to claim 21 wherein said mandrel means are circular in cross section and said fourth mandrel means has a wall defining said third cavities that is compliant.

25. The sensor according to claim 2 further comprising a first cylindrical collar means located centrally of and extending above said first mandrel means, and having passageways therein for receiving said first fiber as it passes from one side of said first collar means to the other.

26. The sensor according to claim 25 further comprising fourth means for rigidly attaching said first collar means and first, second and third mandrel means together at the centers thereof, and fifth means at said centers thereof which operate as attachment points in an array of sensors for providing a sensor which is substantially insensitive to acceleration.

27. The sensor according to claim 25 wherein said first collar means is an integral part of said second mandrel means and said first mandrel means comprises a pair of cylindrical tubes that are pushed over circumferences of said first means.

28. The sensor according to claim 27 wherein said first means provides circumferences for supporting said cylindrical tubes on each side of said collar means.

29. The sensor according to claim 25 wherein said first collar means is an integral part of said first mandrel means.

30. The sensor according to claim 2 wherein said sensor further comprises fourth means for hermetically sealing any junctions of said mandrel means and said first and second means for isolating said cavities and said wound lengths of second fiber from an acoustic wave supporting medium in which the sensor is to be located.

31. The sensor according to claim 2 wherein said first means comprises a plurality of first flanges that are parallel to each other and are spaced apart on and extend equidistant above the circumference of said second mandrel means for defining a plurality of first cavities between adjacent first flanges.

32. The sensor according to claim 31 wherein said first flanges are cylindrical, lengths of said first fiber being wound on said first mandrel means above associated ones of said first cavities.

33. The sensor according to claim 32 wherein said first flanges extend continuously around the circumference of said second mandrel means.

34. The sensor according to claim 32 wherein each of said first flanges is segmented around the circumference of said mandrel means.

35. The sensor according to claim 31 wherein said first flanges are segmented over the lengths thereof, associated segments of said first flanges being circumferentially aligned in groups for providing a number of open-circumferential cavities between said first and second mandrel means and between adjacent groups of first flange segments, lengths of said first fiber being wound on said first mandrel means above associated ones of said first cavities.

36. The sensor according to claim 35 wherein said second means comprises a plurality of second flanges that are parallel to each other and are spaced apart on and extend equidistant above the circumference of said second mandrel means for defining a plurality of second cavities between adjacent second flanges, said second flanges having a depth that is greater than the diameter of said second fiber which is wound around said third mandrel means in ones of said second circumferential cavities.

37. The sensor according to claim 36 wherein said cavities operate as acoustic impedance mismatches for acoustically decoupling said second fiber winding from an incident acoustic pressure wave that is incident on said first fiber winding in an acoustic wave transmitting fluid in which the sensor is located.

38. The sensor according to claim 37 further comprising fourth means for hermetically sealing junctions of said mandrel means for isolating said wound lengths of said second fiber and said cavities from a fluid in which the sensor is to be located.

39. An interferometric fiber optic sensor for sensing acoustic wave energy in an acoustic wave transmitting medium, comprising:

A first cylindrical mandrel means that is a sense mandrel means, is hollow, and has a wall that is compliant in response to an incident acoustic pressure wave signal;

A first optical fiber wound around the circumference of said first mandrel means;

A second cylindrical mandrel means that is a support mandrel, is hollow, and has a wall that is noncompliant;

Said first and second mandrel means and said second means being coaxial and symmetrical about longitudinal axes thereof;

First means located on and extending above the circumference of said second mandrel means so as to contact the interior of said first mandrel means for defining at least one cavity backing a wound length of said first fiber when said second mandrel means is located in said first mandrel means;

A second optical fiber;

Second means for supporting a wound length of said second fiber inside one of said first and second mandrel means; and Third means for connecting points on said first and second fibers so as to form an interferometer;

Said first and second mandrel means and windings being circular in cross section and said second means comprising a third cylindrical mandrel means that is hollow and circular in cross section and a plurality of second flanges that are parallel to each other and periodically spaced apart on and extend equidistant above the circumference of said third mandrel means; said third mandrel means being located in the bore in said second mandrel means with the circumferences of second flanges contacting the interior wall of said second mandrel means for providing at least one second cavity between said second and third mandrel means and adjacent second flanges; lengths of said second fiber being wound on said third mandrel means in said second cavities.

40. The sensor according to claim 26 wherein the thickness of the wall of at least the second cavities of said third mandrel means is sufficient to render said second fiber winding substantially insensitive to an acoustic pressure wave signal in the bore of said third mandrel means.

41. The sensor according to claim 26 wherein said medium is a fluid and the thickness of the wall of the second cavities of said third mandrel means is substantially the same as that of said first mandrel means for also making said third mandrel means compliant whereby said first and second fiber windings respond 180° out-of-phase to the same acoustic pressure wave signal incident on said first winding and in the bore of said third mandrel means.

42. The sensor according to claim 39 wherein the thickness of the walls of at least the second cavity portions of said third mandrel means is sufficiently greater than that of said first mandrel means to render said second fiber winding substantially insensitive to an acoustic pressure wave signal in the bore of said third mandrel means.

43. The sensor according to claim 42 wherein said second cavities between said second and third mandrel means operate as acoustic impedance mismatches for acoustically decoupling said second fiber winding from acoustic energy that is incident on said first fiber winding in an acoustic wave transmitting medium in which the sensor is to be located.

44. The sensor according to claim 43 further comprising fourth means for hermetically sealing junctions of said mandrel means for isolating said wound length of second fiber and said cavities from a fluid medium in which the sensor may be located.

45. The sensor according to claim 39 wherein said medium is a fluid and the thickness of the wall of the cavity portions of said third mandrel means is substantially the same as that of said first mandrel means for also making said third mandrel means compliant whereby said first and second fiber windings respond 180° out-of-phase to the same acoustic pressure wave signal incident on said first winding and in the bore of said third mandrel 46. The hydrophone sensor according to claim 45 wherein said second cavities operate as acoustic impedance mismatches for aiding in acoustically decoupling said second fiber winding from an acoustic pressure wave that is incident on said first fiber winding.

47. The sensor according to claim 46 further comprising fourth means for hermetically sealing junctions to said mandrel means for isolating said wound length of second fiber and said cavities from a fluid medium in which the sensor may be located.

* * * * *